(12) United States Patent
Hammerschmidt

(10) Patent No.: US 9,076,272 B2
(45) Date of Patent: Jul. 7, 2015

(54) WHEEL SPEED SENSOR AND INTERFACE SYSTEMS AND METHODS

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/903,088

(22) Filed: May 28, 2013

(65) Prior Publication Data

US 2014/0358320 A1    Dec. 4, 2014

(51) Int. Cl.

| | |
|---|---|
| *G01M 17/00* | (2006.01) |
| *G01M 17/013* | (2006.01) |
| *G07C 5/00* | (2006.01) |
| *B60T 8/00* | (2006.01) |
| *G01P 3/00* | (2006.01) |
| *B60T 8/171* | (2006.01) |
| *G01P 3/44* | (2006.01) |
| *G01P 15/00* | (2006.01) |
| *G01M 17/02* | (2006.01) |
| *G01P 3/487* | (2006.01) |

(52) U.S. Cl.
CPC ... *G07C 5/00* (2013.01); *G01P 3/44* (2013.01); *G01M 17/013* (2013.01); *G01P 15/00* (2013.01); *G01P 3/443* (2013.01); *G01M 17/02* (2013.01); *G01P 3/487* (2013.01); *B60T 8/00* (2013.01); *G01P 3/00* (2013.01); *B60T 8/171* (2013.01); *B60T 2250/06* (2013.01)

(58) Field of Classification Search
CPC ............ B60T 8/00; B60T 8/32; G01M 17/00; G01M 17/013; G01M 17/02
USPC ............ 701/1, 36, 48, 70, 71, 72, 74, 82, 90, 701/93, 30.8, 30.9, 31.1; 702/1, 33–36, 47, 702/96, 98, 99, 104, 138, 142, 145, 148, 702/173; 73/115.01, 115.07, 115.08, 73/121–132, 146, 146.2, 146.4, 146.5, 73/488, 494; 324/200, 207.13, 260; 303/121, 122.03, 122.06, 132, 138, 303/147, 177, 198; 340/444, 453
See application file for complete search history.

(56) References Cited

U.S. PATENT DOCUMENTS

| | | | | |
|---|---|---|---|---|
| 4,894,613 | A * | 1/1990 | Tsugawa | 324/173 |
| 4,916,643 | A * | 4/1990 | Ziegler et al. | 702/188 |
| 5,043,658 | A * | 8/1991 | Braschel et al. | 324/160 |
| 5,140,260 | A * | 8/1992 | Braschel et al. | 324/160 |
| 5,723,768 | A * | 3/1998 | Ammon | 73/8 |
| 5,740,042 | A * | 4/1998 | Fujioka | 701/71 |
| 5,748,503 | A * | 5/1998 | Saeki et al. | 702/148 |

(Continued)

FOREIGN PATENT DOCUMENTS

| | | |
|---|---|---|
| DE | 19911774 A1 | 12/1999 |
| DE | 102006036197 A1 | 2/2007 |
| DE | 102009019645 A1 | 11/2009 |

*Primary Examiner* — Thomas Tarcza
*Assistant Examiner* — Tyler J Lee
(74) *Attorney, Agent, or Firm* — Eschweiler & Associates, LLC

(57) ABSTRACT

A measurement system includes a speed plus sensor and a control unit. The speed plus sensor is configured to detect a magnetic field in response to speed and resonance characteristics. The speed plus sensor is also configured to generate a sensor output signal having speed data and enhanced resonance data. The control unit is configured to receive the sensor output signal.

17 Claims, 8 Drawing Sheets

(56) References Cited

U.S. PATENT DOCUMENTS

| | | | |
|---|---|---|---|
| 5,982,279 A * | 11/1999 | Tominaga et al. | 340/444 |
| 6,246,226 B1 * | 6/2001 | Kawase et al. | 324/166 |
| 6,282,954 B1 * | 9/2001 | Ott et al. | 73/488 |
| 6,542,847 B1 * | 4/2003 | Lohberg et al. | 702/148 |
| 6,747,553 B2 * | 6/2004 | Yamada et al. | 340/441 |
| 6,903,653 B2 * | 6/2005 | Hartmann et al. | 340/444 |
| 7,324,887 B2 * | 1/2008 | Kawasaki et al. | 701/93 |
| 7,385,387 B2 * | 6/2008 | Kondo | 324/166 |
| 7,830,278 B2 | 11/2010 | Lohberg et al. | |
| 7,860,633 B2 * | 12/2010 | Stubenrauch et al. | 701/60 |
| 8,135,537 B2 * | 3/2012 | Martin et al. | 701/537 |
| 8,327,697 B2 | 12/2012 | McCann et al. | |
| 8,368,388 B2 * | 2/2013 | Lohberg et al. | 324/174 |
| 2001/0030466 A1 * | 10/2001 | Ehrlich et al. | 303/191 |
| 2002/0005780 A1 * | 1/2002 | Ehrlich et al. | 340/453 |
| 2004/0015312 A1 * | 1/2004 | Asano et al. | 702/113 |
| 2004/0200273 A1 * | 10/2004 | Giustino et al. | 73/146 |
| 2005/0081613 A1 * | 4/2005 | Hattori | 73/146 |
| 2005/0235744 A1 * | 10/2005 | Ogawa | 73/146 |
| 2008/0148806 A1 * | 6/2008 | Bell | 73/1.37 |
| 2009/0306851 A1 * | 12/2009 | Joyce | 701/36 |
| 2010/0090690 A1 * | 4/2010 | Lohberg et al. | 324/207.25 |
| 2010/0204869 A1 * | 8/2010 | Hall et al. | 701/29 |
| 2010/0250082 A1 * | 9/2010 | King et al. | 701/70 |
| 2011/0219864 A1 * | 9/2011 | Yukawa et al. | 73/146.3 |
| 2012/0245787 A1 * | 9/2012 | Kawasaki | 701/29.1 |
| 2012/0296493 A1 * | 11/2012 | Wakao | 701/1 |
| 2013/0069642 A1 | 3/2013 | Sapozhnikov et al. | |
| 2013/0211737 A1 * | 8/2013 | Batcheller et al. | 702/34 |

* cited by examiner

WHEEL SPEED SENSOR AND INTERFACE SYSTEMS AND METHODS

BACKGROUND

Automotive systems are complex systems that include computers and components to operate and monitor operation automotive vehicles. The systems typically include a processor that controls and monitors engine operation and the like. The system generally operates various control systems that perform automotive functions. By monitoring, minor problems can be identified and corrected before becoming major problems.

One type of sensor often used in automotive systems is an anti-lock braking system (ABS) sensor. Such sensors monitor speed or wheel speed and convey the information back to an electronic control unit (ECU). The ECU then performs whatever operations necessary in response.

DETAILED DESCRIPTION

Figure 1:
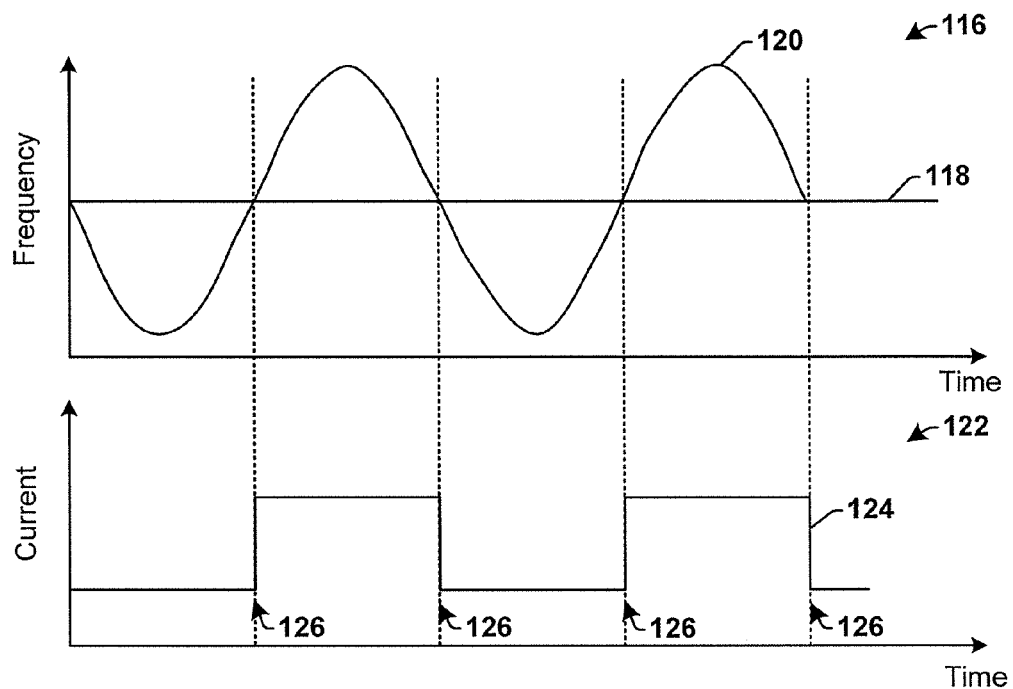
FIG. 1 is a graph illustrating transmission of speed information using digital current modulation using a conventional system.

The present invention will now be described with reference to the attached drawing figures, wherein like reference numerals are used to refer to like elements throughout, and wherein the illustrated structures and devices are not necessarily drawn to scale.

Systems and methods are disclosed that facilitate automotive systems. The systems and methods include speed sensors that convey information beyond speed. The sensors additionally provide resonance information, which includes tire wobble, tire pressure, rotational direction, and the like, that can be utilized by the electronics control system to facilitate operation of the automotive system and the vehicle.

FIG. 1 is a graph illustrating transmission of speed information using digital current modulation using a conventional system.

A magnetic sensor is configured to obtain a sensor signal 120. The sensor signal is obtained using a suitable mechanism for measuring tire rotation in an automotive system. The sensor signal 120 has an average value shown as 118. Further, the sensor signal 120 has zero crossings, which are points of the sensor signal 120 that intersect with the average value 118.

A digital current signal 124 is generated to convey speed information for the automotive system. The digital current signal 124 is based on or converted the sensor signal 120 and has stepped values from a first level to a second level. In one example, the digital current signal 124 is converted from the sensor signal 120 using an antilock brake system protocol. Generally, levels are switched at zero crossings of the sensor signal 120. Further, the level for a given time period depends upon whether the sensor signal 120 is above or below the average value 118. For example, in a first period, the sensor signal 120 is below the average value and the current signal 124 is provided at the first level. However, at a first zero crossing or sample 126, the current signal 124 transitions to the second level, such as a higher current.

An electronic control unit (not shown) receives the current signal 124 and uses the samples 126 and the current signal 124 to identify or determine a speed for the automotive system. However, the speed information or data is limited to the number of samples 126 present. Further, signal noise has a tendency to be increased near the zero crossings, thus the timing of the samples can include substantial error. For example, a positive noise contribution causes switching from a first level to a second level to be earlier, while a negative noise contribution causes switching to be delayed. The highly amplified noise results in a high noise level with a spectral density.

Figure 2:
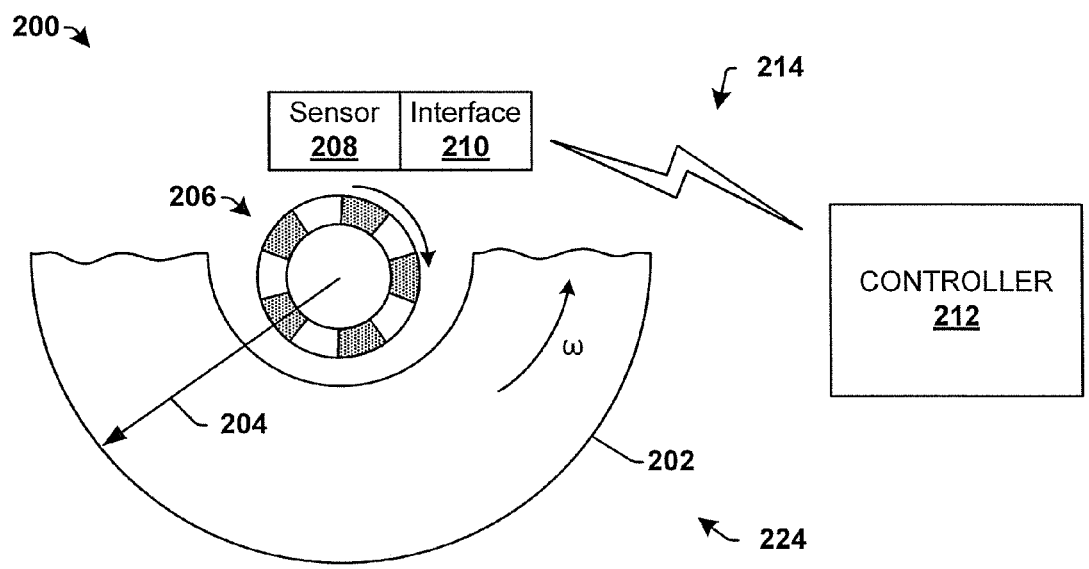
FIG. 2 is a diagram illustrating a tire monitoring system.

FIG. 2 is a diagram illustrating a tire monitoring system 200. The system 200 monitors tire information including, but not limited to, speed. The system 200 can be utilized within automotive systems including, but not limited to, anti-lock braking systems (ABS).

The system 200 includes a tire 202, a magnetic pole wheel 206, a sensor 208, an interface 210, and a control unit 212. The sensor 208 and the interface 210 are included as a speed plus sensor and interface 224. The sensor 208 is configured to detect a magnetic field generated by a suitable component, such as the magnetic pole wheel 206, positioned along an axis 204 of the tire 202. The magnetic pole wheel 206 includes alternating magnetic poles that generate a modulated magnetic field that varied according to wheel speed and other oscillations and/or vibrations of the tire 202.

The tire 202 rotates with a frequency or speed and initiates changes in the magnetic field due to speed and other characteristics. As described above, the speed of the tire changes the oscillations of the magnetic field. Additionally, other characteristics of the tire, including tire wobble, tire pressure, rotation direction, and the like also incur changes in the magnetic field. For example, deflation of the tire 202 causes the tire 202 to operate according to different resonance frequencies or q-factors for a given mode of oscillation and/or vibration. As another example, angular vibrations cause torque in a sidewall of the tire 202 that either increases the angular velocity ω of the tire 202 (if vibration is in a same direction as tire rotation) or decreases the angular velocity ω of the tire 202 (if vibration is in an opposite direction as tire rotation). Similarly, radial vibrations cause a change in the radius of the tire 202 that either increase the angular velocity ω of the tire with respect to the speed of the car (if radius is decreased) or decrease the angular velocity ω of the tire with respect to the speed of the car (if radius of tire is increased). These other characteristics can be conveyed as resonance information or data.

The sensor 208 is connected to a communication interface 210 that transmits information about the tire 202 as an output signal 214 to the control unit via a suitable protocol for anti-lock breaking systems (ABS).

Figure 3:
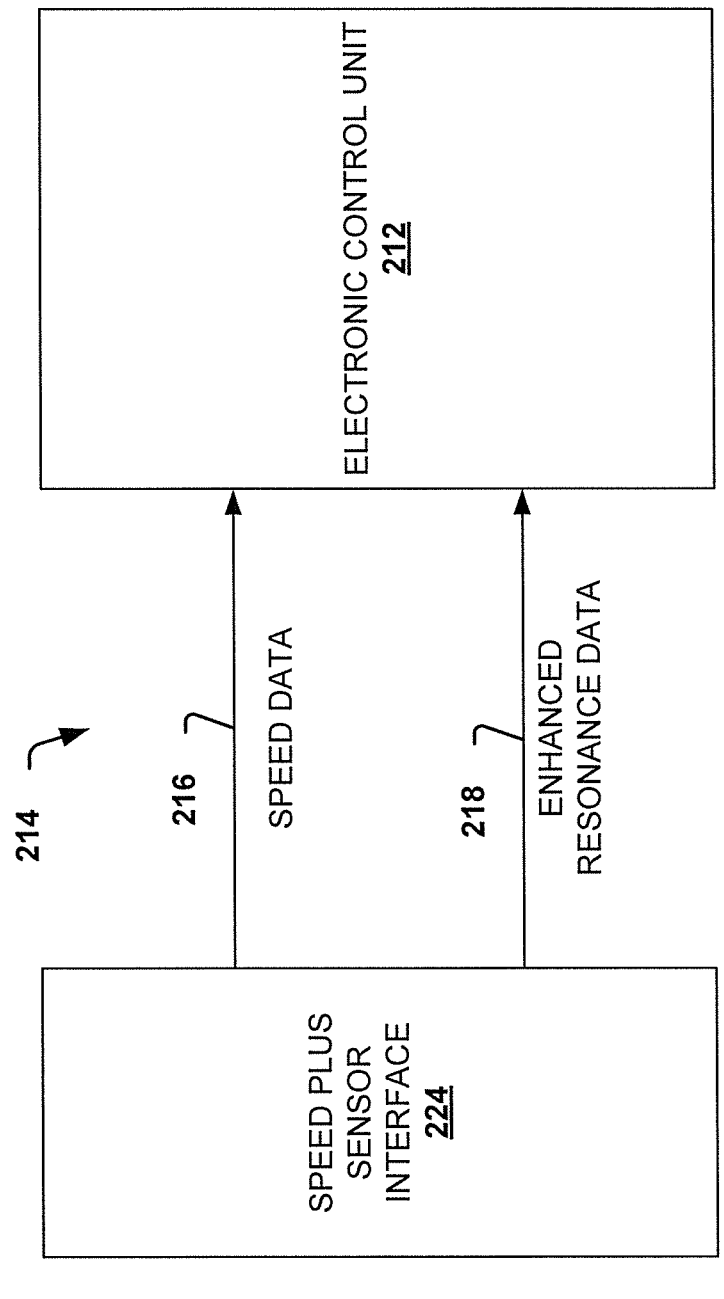
FIG. 3 is a block diagram illustrating a sensor based monitoring system.

FIG. 3 is a block diagram illustrating a sensor based monitoring system 300. The system 300 provides both speed and enhanced resonance data, instead of merely providing speed data. The enhanced resonance data includes resonance characteristics and is provided at a relatively higher quality, including improved signal to noise ratio, compared to resonance data provided with conventional ABS sensor protocols.

The system 200 includes a speed plus sensor and interface 224 and an electronic control unit (ECU) 212. The speed plus sensor 224 includes a sensor, such as the sensor 108, described above. The speed plus sensor 224 measures a magnetic field about a magnetic pole wheel or magnetic tooth wheel. The measured magnetic field is converted to a suitable protocol and provided to the ECU 202 as the output signal 214 having a speed data portion 216 and an enhanced resonance data portion 218.

The speed data portion 216 provides information or data related to speed of a tire. The enhanced resonance data portion 218 provides information or data related to other characteristics or parameters of the tire, such as pressure, wobble, and the like. The speed data portion 216 and the enhanced resonance data portion 218 together comprise an output signal 214 and can be provided as separate signals or can be combined into a single signal. In one example, the enhanced resonance data portion 218 and the speed data portion 216 are provided in the form of an analog signal. In another example, the enhanced resonance data portion 218 and the speed data portion 216 are provided in the form of a digital signal with other components.

Some examples of suitable signals that encompass the enhanced resonance data portion 208 and the speed data portion 206 are provided below.

The ECU 202 receives the enhanced resonance data portion 208 and the speed data portion 206 and determines operation information about the tire and/or automotive system. The operation information includes, for example, speed, tire pressure, tire direction, tire wobble, and the like.

Figure 4:
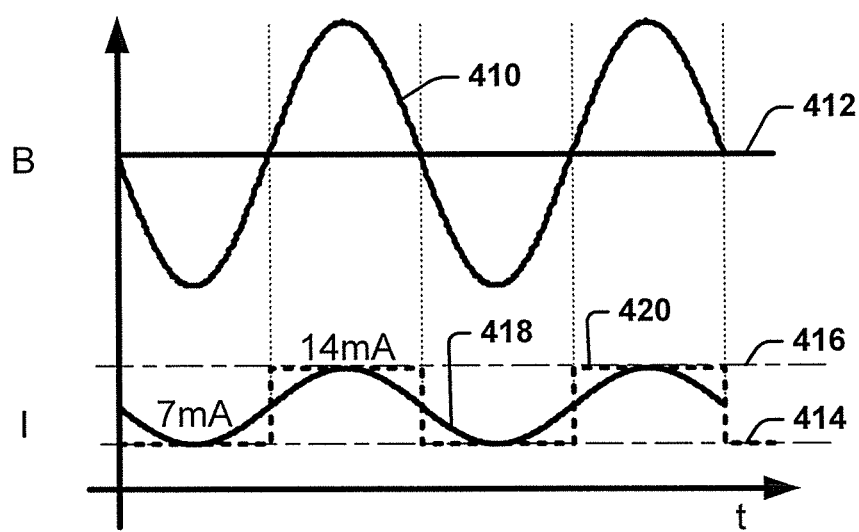
FIG. 4 is a graph depicting a magnetic sensor output and a resulting analog modulated current signal conveying speed data and enhanced resonance data.

FIG. 4 is a graph depicting a magnetic sensor output and a resulting analog modulated current signal conveying speed data and enhanced resonance data. The graph depicts time along an x-axis and current (I) and magnetic flux density (B) along a y-axis. The graph includes a magnetic signal 410 and an output signal 418.

The magnetic signal or magnetic sensor signal 410 represents a magnetic field obtained from a magnetic sensor within an automotive system. The magnetic sensor signal 410 is provided by a sensor, such as the sensor 208 of FIG. 2. The sensor signal 410 can be scaled and/or otherwise modified.

The output signal 418, which is a modulated current signal, represents the information of the magnetic sensor signal 410. For comparison, a standard speed pulse 420 is shown. The output signal 418 is converted and/or generated from the magnetic sensor signal 410. The output signal 418 may be generated by the speed plus sensor interface 224, described above.

In this example, the output signal 418 is developed as an analog version of the sensor signal 412. The output signal 418 oscillates between a first level 414 and a second level 416. In one example, the output signal 418 is obtained by suitably scaling the sensor signal 410 so as to be within or at the first level 414 and the second level 416. The first and second levels 414, 416, in one example, have values that comply with a communication protocol, such as 7 mA and 14 mA, for the first level 414 and the second level 416, respectively.

The output signal 418 includes substantial portion of the information present in the magnetic sensor signal 410 and includes information beyond speed data. As shown in FIG. 4, the output signal 418 is proportional to the magnetic sensor signal 410 and its peaks and valleys correspond to the peaks and valleys of the magnetic sensor signal.

The output signal 418 is configured to comply with selected specifications and/or communication protocols. For example, the selected specifications or protocols may set current limits on the signal 418. Thus, the output signal 418 can be sent to the ECU 212 or another component using standard wires and/or bus because it complies with, for example, a state of the art ABS communication protocol. The ECU 212 can analyze the current signal 418 and obtain the speed data 206 and the enhanced resonance data 208 therefrom.

Figure 5:
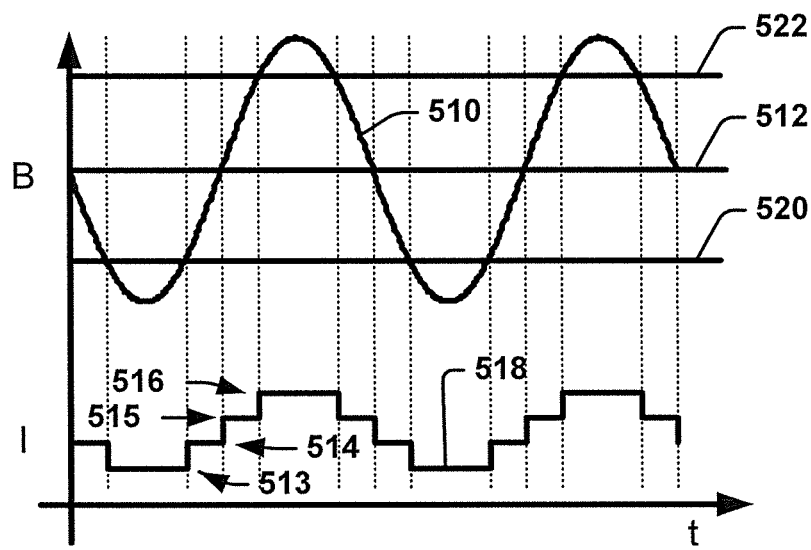
FIG. 5 is a graph depicting a magnetic sensor output and a resulting multi-level output signal.

FIG. 5 is a graph depicting a magnetic sensor output and a resulting multi-level output signal. The graph depicts time along an x-axis and current (I) and a magnetic field (B) frequency along a y-axis. The graph includes a magnetic sensor signal 510 and an output signal 518.

The magnetic sensor signal 510 represents a magnetic field obtained via a magnetic sensor within an automotive system. The sensor signal 510 has an average value 512. Intersections of the sensor signal 510 and the average value 512 are referred to as zero crossing points. The magnetic sensor signal 510 is provided by a suitable sensor proximate to a vehicle tire, such as the sensor 208 of FIG. 2.

The output signal 518 is a substantially digital signal with more than two levels. It is noted that two levels convey speed information only, as described above with regard to FIG. 1. Here, there are multiple levels that provide information beyond speed data, such as the enhanced resonance data.

The output signal 518 is shown having four levels, a first level. 513, a second level 514, a third level 515, and a fourth level 516. The output signal 518, in this example, is obtained by quantizing the magnetic sensor signal 510. For example, values of the sensor signal 518 less than a lower value 520 are translated to the first level 513. Values between the average signal 512 and the lower value 520 are quantized to the second level 514. Values between the average signal 512 and an upper value 522 are quantized to the third level 515. Values greater than the upper value 522 are quantized to the fourth level 516. Thus, the second and third levels 514 and 515 can be utilized to obtain speed data and the other levels can be utilized to obtain enhanced resonance data. The output signal 518 is provided in compliance with selected specifications and/or protocols.

The output signal 518 is generated by the speed plus sensor interface 224 and/or the sensor interface 210, described above. An additional example describing generation of such an output signal is described below. Generally, the output signal 518 is generated by sampling or quantizing the sensor signal 510.

The output signal 518 can then be provided to an ECU or similar component. The speed data and enhanced resonance data can be obtained from the output signal 518.

Figure 6:
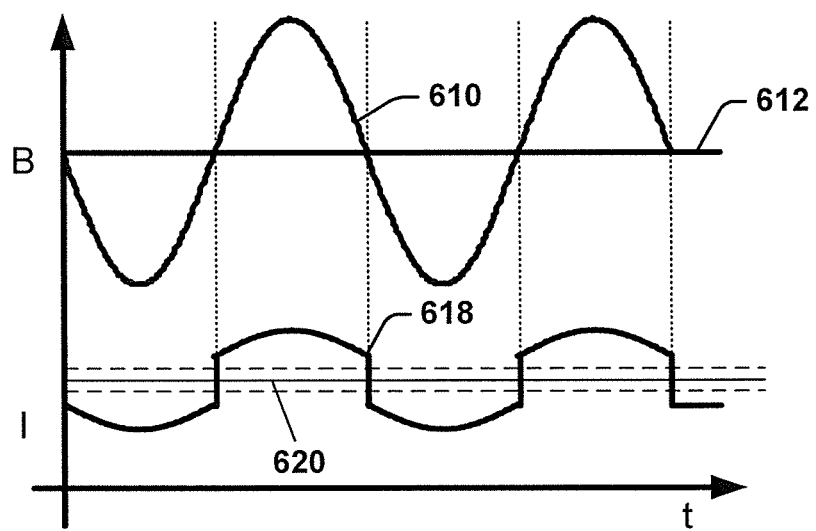
FIG. 6 is a graph depicting a magnetic sensor output and a resulting hybrid digital and analog output signal.

FIG. 6 is a graph depicting a magnetic sensor output and a resulting hybrid of a conventional ABS speed pulse and analog output signal that is derived from the sensor output. In other examples the overlayed output signal of the sensor may also be derived from an A/D converted and digitally processed (e.g., normalized or filtered) representation of the sensor signal. The graph depicts time along an x-axis and current (I) and a magnetic field (B) frequency along a y-axis. The graph includes a magnetic sensor signal 610 and an output signal 618.

The magnetic sensor signal 610 represents a magnetic field obtained via a magnetic sensor within an automotive system. The sensor signal 610 has an average value 612. Intersections of the sensor signal 610 and the average value 612 are referred to as zero crossing points. The magnetic sensor signal 610 is provided by a suitable sensor proximate to a vehicle tire, such as the sensor 208 of FIG. 2.

The output signal 618 is a hybrid signal and includes analog and digital components. The output signal 618 can be generated by overlaying an analog signal, such as the magnetic sensor signal 610, onto a speed sensor signal, such as the signal 124 of FIG. 1. The output signal 618 has edges, which facilitate detection of timing and speed. The edges correspond to zero crossing points of the analog signal 610. Additionally, the output signal 618 includes an analog portion between the edges which tracks or correlates to portions of the magnetic sensor signal 610. Further, the edges have a sufficient height to comply with a detection threshold 620.

The output signal 618 can then be provided to an ECU or similar component. The speed data can be obtained by detecting edges in compliance with the detection threshold 620. The enhanced resonance data can be obtained from the analog portions of the output signal 618.

The output signal 618 is suitable for relatively complex ABS protocols that include additional data, such as rotation direction, vehicle stability control (VSC), automatic transmission operation.

Figure 7:
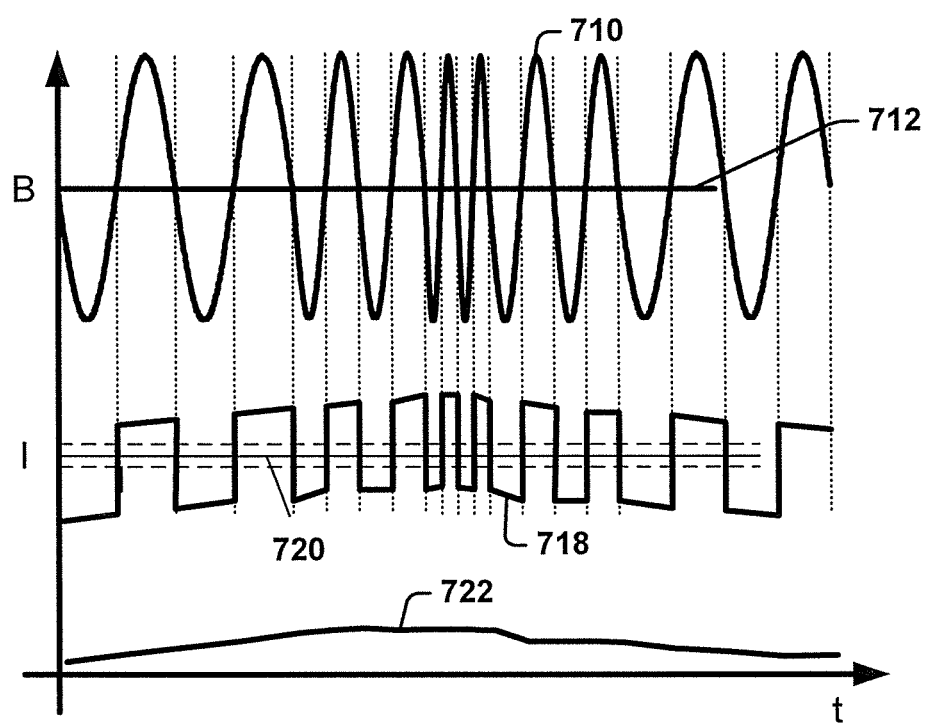
FIG. 7 is a graph depicting a magnetic sensor output and a shifting output signal.

FIG. 7 is a graph depicting a magnetic sensor output and a shifting output signal. The graph depicts time along an x-axis and current (I) and a magnetic field (B) frequency along a y-axis. The graph includes a magnetic sensor signal 710 and an output signal 718.

Again, the magnetic sensor signal 710 represents a magnetic field obtained via a magnetic sensor within an automotive system. The sensor signal 710 has an average value 712. Intersections of the sensor signal 710 and the average value 712 are referred to as zero crossing points. The magnetic sensor signal 710 is provided by a suitable sensor proximate to a vehicle tire, such as the sensor 208 of FIG. 2.

Here, a longer duration sensor signal 710 is provided and variations in frequency can be observed. These variations correspond to changes in speed.

The output signal 718 shifts by a shift amount according to frequency and/or other characteristics of the magnetic sensor signal 710. However, the shift amount still maintains edges of the output signal 718 within the threshold value 720.

A controller or other component, such as the ECU, use the output signal to generate an analog speed signal 722 as shown. Other information, including the enhanced resonance data, can also be obtained from the output signal 718.

One technique to generate the speed signal 722 is to use time between edges of a digital signal. Another technique is to remove edges and reassemble a signal into the speed signal 722, in a continuous way. Subsequently, a low pass filter may be utilized to mitigate resonance effects. Thus, a continuous time signal at relatively low bandwidth related to the speed is provided as the speed signal. The low bandwidth, for example less than 1 kHz is far away from typical transmission distortions, for example greater than 100 kHz, and a suitable separation can be obtained.

Alternately, the magnetic sensor signal 710 can be used with a line equalizer that adapts to remove distortions created by inserted edges while being transmitted over a two wire bus.

Analysis and/or demodulation can be performed on the output signal 718 to generate the analog speed signal 722. This can be performed at a sensor, sensor interface, or at the ECU. The resulting speed signal 722 is relatively slow in terms of change. Thus, measuring the signal can be performed with less complex components, such as a multiplexed analog to digital converter (ADC). Further, if the speed signal 722 is generated by the sensor, then the speed signal 722 can be utilized as redundant information to verify speed information or data derived from the output signal 718. In another example, the speed signal 722 is filtered to isolate the relevant frequencies for the analysis of tire vibrations (this may be a high pass with e.g. 5 Hz corner or a low pass with e.g. 100 Hz corner or a band pass combining both). This filter may be located before the overlay with the pulses on the sensor side or after removal of the pulses on the ECU side).

It is appreciated that the speed signal 722 can be compared with a second speed signal, generated from the output signal 718 or another output signal including speed information in order to provide information redundancy.

It is noted that the output signals 410, 510, and 610 require demodulation to extract the speed data and enhanced resonance data. This facilitates compatibility with existing protocols, such as existing ABS protocols. In FIG. 7, the speed signal 722 is already demodulated and represents the wheel speed thus the demodulation happens necessarily on the sensor.

Figure 8:
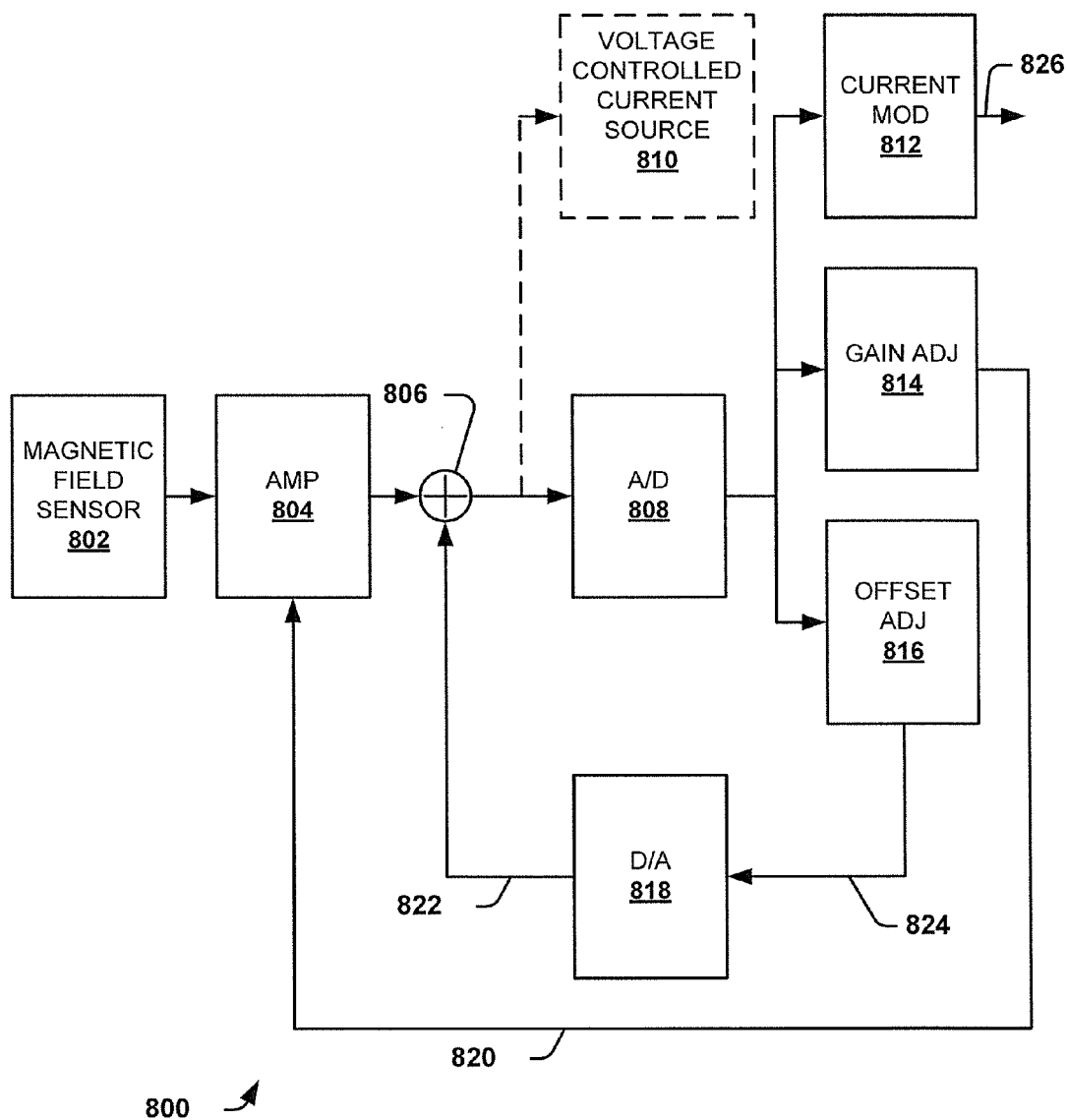
FIG. 8 is a block diagram illustrating a sensor system configured to generate an analog sensor output signal within appropriate limits.

FIG. 8 is a block diagram illustrating a sensor system 800 configured to generate an analog sensor output signal within appropriate limits. Instead of using only two discrete current levels, scaled current values are used that comply with protocol current requirements. These requirements include one or more of, an upper level current value, a lower level current value, an average current value, and the like. FIG. 4, shown above, provides an example output signal that may be generated by the system 800.

The system 800 includes a magnetic field sensor 802, an amplifier 804, a summation component 806, an analog to digital (A/D) converter 808, a voltage controlled current source 810, a current modulation component 812, a gain adjustment component, an offset adjustment component, and a digital to analog (D/A) converter 818.

The magnetic field sensor 802 operates similar to the sensor 108, described above and measures a magnetic field about a magnetic pole wheel and/or magnetic tooth wheel. The sensor 802 provides a field sensor output to the amplifier 804. The amplifier 804 provides a scaled sensor output to the summation component 806 according to a gain factor 820.

The summation component 806 sums the scaled sensor output with an offset 822 to yield a modified sensor output. The modified sensor output is an analog signal in this example.

The modified sensor output is provided to the A/D converter 808, which converts the analog signal to a digital signal. The digital signal is referred to as a digital sensor output, and is provided to the current modulation component 812, the gain adjustment component 814, and the offset adjustment component 816.

The current modulation component 812 generates a modulated current based on the digital sensor output. The modulated current is modulated to contain both speed and enhanced resonance data and is also referred to as the system output signal 826. The output signal 826 is an analog signal and complies with a communication protocol, including specified voltage limits. For example, the output signal 826 modulates between a first level and a second level, as shown by the signal 418 of FIG. 4.

The gain adjustment component 814 calculates or generates a gain factor 820. The gain adjustment component 814 analyzes the digital sensor output to determine whether the gain of the amplifier 804 should be adjusted and if so, how much. Thus, the gain adjustment component 814 determines the gain factor 820 based on the digital sensor output. In one example, the gain adjustment component 814 compares the digital sensor output with a threshold value to determine the gain factor 820.

The offset adjustment component 816 develops a digital offset 824 in order to average the scaled sensor output about zero. Thus, for example, if the offset adjustment component 816 detects or determines that the scaled sensor output is averaged or centered about a non-zero value, the offset adjustment component 816 develops the digital offset 824 accordingly. The digital to analog converter 818 converts the digital offset 824 to the analog offset 822. As shown above, the analog offset 822 is combined with the scaled sensor output by the summation component 806.

One alternative to using the current modulation component 812 to generate the modulated current is to use the voltage controlled current source 810. This current source 810 utilizes the modified sensor output from the summation component 806 without the need to convert to a digital format.

It is appreciated that variations in the configuration and arrangement of the components within the system 800 are suitable and contemplated. For example, the analog to digital conversion can occur prior to amplification or can be omitted all together.

Figure 9:
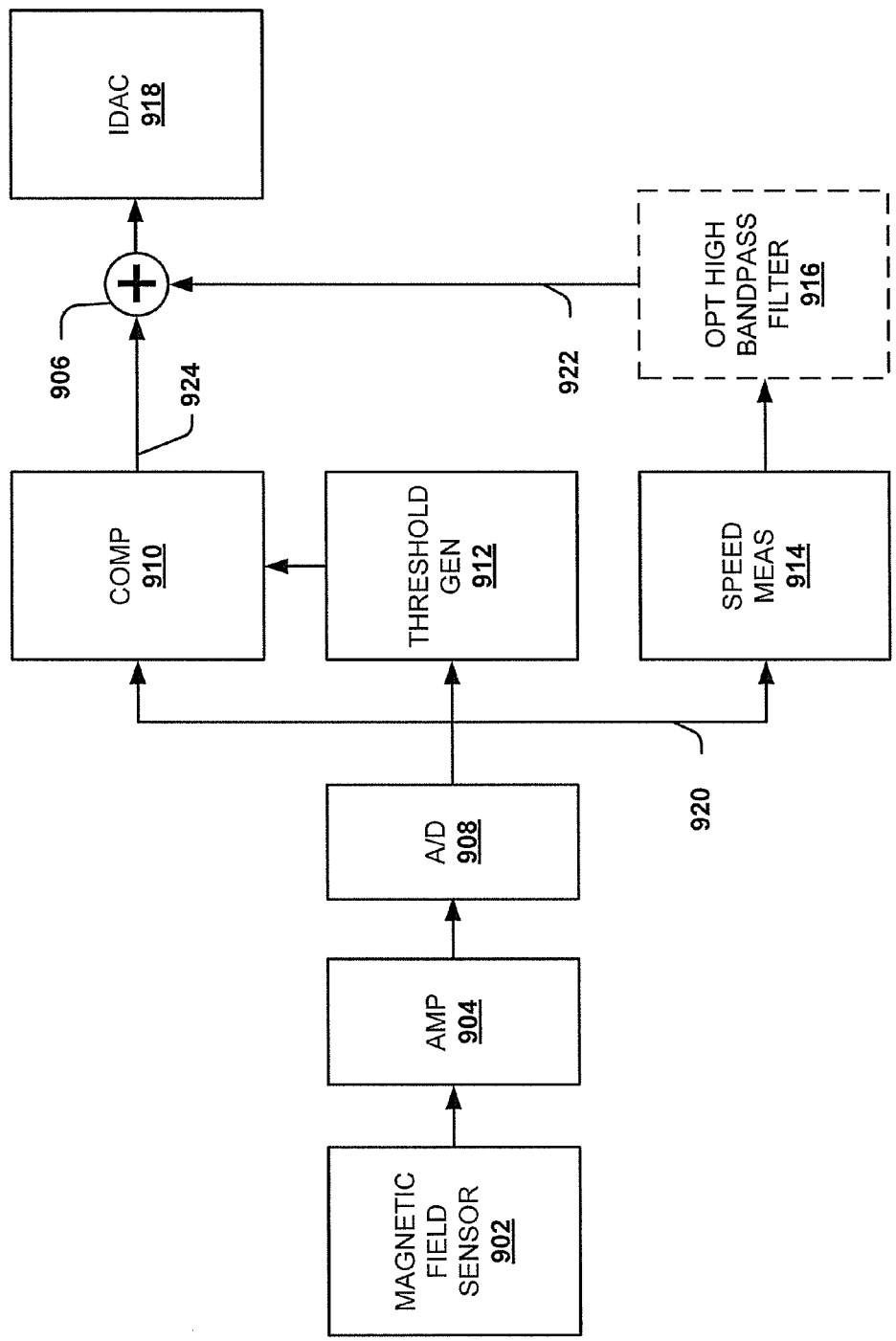
FIG. 9 is a block diagram illustrating a sensor system configured to generate a sensor output signal and a speed signal.

FIG. 9 is a block diagram illustrating a sensor system 900 configured to generate a sensor output signal and a speed signal. The output signal provides speed data and enhanced resonance data. Additionally, a separate speed signal is generated that can include only speed information or data.

By processing the output signal within the sensor 900 instead of at an external component or controller, a reduction in required bandwidth for the output signal can be obtained.

The system 900 includes a magnetic field sensor 902, an amplifier 904, an A/D converter 908, a comparator component 910, a threshold generator component 912, a speed measurement component 914, a high pass filter 916 and an IDAC 918. The magnetic field sensor 902 operates similar to the sensor 108, described above and measures a magnetic field about a magnetic pole wheel and/or magnetic tooth wheel. The sensor 902 provides a field sensor output to the amplifier 904. The amplifier 904 provides a scaled sensor output to the A/D converter 908.

The A/D converter 908 digitizes the scaled sensor output and provides a digital sensor output 920. The digital sensor output 920 is provided to the comparator component 910, the threshold generation component 912, and the speed measurement component 914. The speed measurement component 914 analyzes the digital sensor output 920 and generates a speed measurement signal in response. The speed measurement signal can be filtered by a high bandpass filter 916 to remove unwanted frequency components and to smooth out the signal. The filtered speed measurement signal 922 can be provided to other components, such as an ECU, or, as shown in FIG. 9, to the summation component 906.

The threshold generation component 912 analyzes the digital sensor output from the A/D converter 908 to adjust and/or modify a detection threshold. The adjusted detection threshold is provided as an input to the comparator component 910.

The comparator component 910 compares the digital sensor output with the adjusted detection threshold. The comparator component 910 generates a comparator output 924 as a result. The comparator output 924 has a first value on the digital sensor output exceeding the adjusted detection threshold and a second value on the digital sensor output being below the adjusted detection threshold.

The summation component 906 combines the comparator output 924 with the unfiltered or filtered speed measurement signal 922 to generate an output signal. As a result, output values of the output signal 924 are shifted or multiplexed with to the speed measurement signal 922. As an example, line 718 of FIG. 7 provides an example of an output signal having shifted values according to a speed measurement signal.

The output signal 924 can be provided to the IDAC 918 or to another component, such as the ECU 212 of FIG. 2. In one example, the ECU is configured to determine a characteristic of one or more resonance parameters (e.g., frequencies, q-factors, etc.) based on the output signal.

Figure 10:
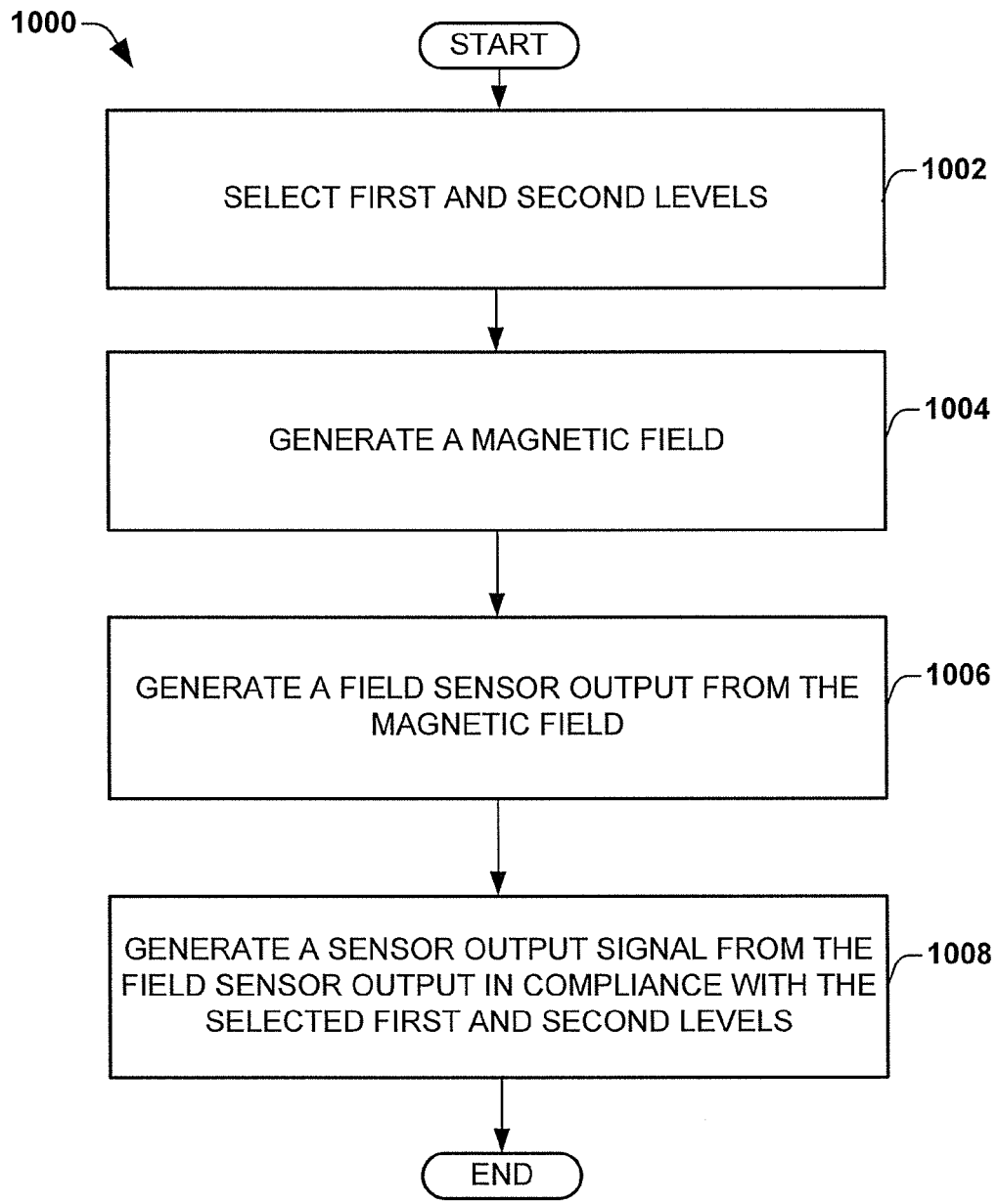
FIG. 10 is a flow diagram illustrating a method of generating a sensor output signal having speed data and enhanced resonance data.

FIG. 10 is a flow diagram illustrating a method 1000 of generating a sensor output signal having speed data and enhanced resonance data. The method 1000 generates the sensor output signal from magnetic field variations. The sensor output signal is generated in compliance with one or more protocols and/or specifications.

The method 1000 begins at 1002, wherein a first level and a second level are selected. These levels are selected to comply with specifications and/or communication protocols. In one example, the first level is selected to be 7 mA and the second level is selected to be 14 mA in compliance with an automotive system communication protocol.

A magnetic field is generated in response to tire vibrations at block 1004. The tire vibrations include angular rotation of a wheel, radial vibrations, and the like. In one example, a magnetic pole wheel is attached to a tire and is configured to generate the magnetic field.

A field sensor output is generated from the magnetic field at block 1006. The field sensor output is an analog signal and does not generally comply with the selected first and second levels. A magnetic field sensor, such as the sensor 208 described above, can be utilized to generate the field sensor output.

A sensor output signal is generated from the field sensor output at block 1008. The sensor output signal is generated in compliance with the selected first and second levels. For example, the sensor output signal can comply with current limit requirements for an automotive protocol. In another example, the first and second levels correspond to upper and lower power limits or voltages. The sensor output signal can be analog, digital, and/or a combination of both. In one example, the sensor output signal is a scaled from the field sensor output to comply with the selected levels.

The sensor output signal can then be utilized and/or analyzed to obtain speed and/or enhanced resonance data or parameters. The enhanced resonance data is provided with a relatively higher signal to noise ratio than other approaches.

While method 1000 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown in FIGS. 1, 2, etc., are non-limiting examples of system that may be used to implement method 1000). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A measurement system includes a speed plus sensor and a control unit. The speed plus sensor is configured to detect a magnetic field in response to speed and resonance characteristics. The speed plus sensor is also configured to generate a sensor output signal having speed data and enhanced resonance data. The control unit is configured to receive the sensor output signal.

A measurement system includes a magnetic field sensor, a summation component, and a current modulation component. The field sensor is configured to measure a magnetic field and generate a field sensor output. The summation component is configured to combine an offset with the field sensor output to provide a modified sensor output. The current modulation component is configured to generate a sensor output signal from the modified sensor output. The sensor output signal has speed data and enhanced resonance data.

A method of generating a sensor output signal having speed data and enhanced resonance data is disclosed. A first current level and a second current level are selected. A magnetic field is generated in response to tire vibrations. A field sensor output is generated from the magnetic field. A sensor output signal is generated from the field sensor output according to the selected first level and the second level. The sensor output signal includes speed data and enhanced resonance data.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A measurement system comprising:
a speed plus sensor comprising a magnetic field sensor configured to detect a magnetic field in response to speed and resonance characteristics and generate a field sensor output;
a comparator component configured to receive the field sensor output and generate a comparator output by comparing the field sensor output with a threshold;
a speed measurement component configured to receive the field sensor output and generate a speed measurement signal having information relating to speed, based on frequency information from the field sensor output;
a summation component configured to add the speed measurement signal to the comparator output and generate a sensor output signal, amplitude shifted with respect to the speed measurement signal, wherein the sensor output signal comprises speed data and enhanced resonance data.

2. The system of claim 1, wherein the magnetic field is generated in response to a wheel rotation that is influenced by tire vibrations.

3. The system of claim 1, wherein the magnetic field sensor includes a magnetic pole wheel and is configured to generate the magnetic field in response to rotation and vibration of a tire.

4. The system of claim 1, wherein the resonance characteristics include at least one mode of vibration that influences a rotational speed of a wheel.

5. The system of claim 1, therein the speed plus sensor includes an interface configured to generate the output signal according to a protocol.

6. The system of claim 5, wherein the protocol includes first and second current levels, and wherein the sensor output signal is generated within the first and second current levels.

7. The system of claim 1, wherein the sensor output signal is an analog signal.

8. The system of claim 1, wherein the sensor output signal includes digital and analog components.

9. The system of claim 1, wherein the sensor output signal includes at least three levels.

10. A measurement system comprising:
a magnetic field sensor configured to measure a magnetic field and generate a field sensor output;
a summation component configured to combine an offset derived from the field sensor output, with the field sensor output to provide a modified sensor output; and
a current modulation component configured to generate a sensor output signal from the modified sensor output, the sensor output signal having speed data and enhanced resonance data.

11. The system of claim 10, wherein the current modulation component is configured to generate the sensor output signal according to a protocol having a lower level and an upper level.

12. The system of claim 10, further comprising an amplifier configured to scale the field sensor output according to a gain factor.

13. The system of claim 12, further comprising a gain adjustment component configured to generate the gain factor from the modified sensor output.

14. The system of claim 10, further comprising an analog to digital converter configured to convert the modified sensor output into a digital sensor output.

15. The system of claim 14, wherein the current modulation component is configured to utilize the digital sensor output to generate the sensor output signal.

16. The system of claim 14, further comprising an offset adjustment component configured to generate the offset from the digital sensor output.

17. The system of claim 10, further comprising a speed measurement component configured to generate an analog speed measurement signal from the modified sensor output.

* * * * *